R. L. NOWELL.
SOD AND POTATO VINE CUTTER.
APPLICATION FILED AUG. 1, 1910.
988,805.
Patented Apr. 4, 1911.
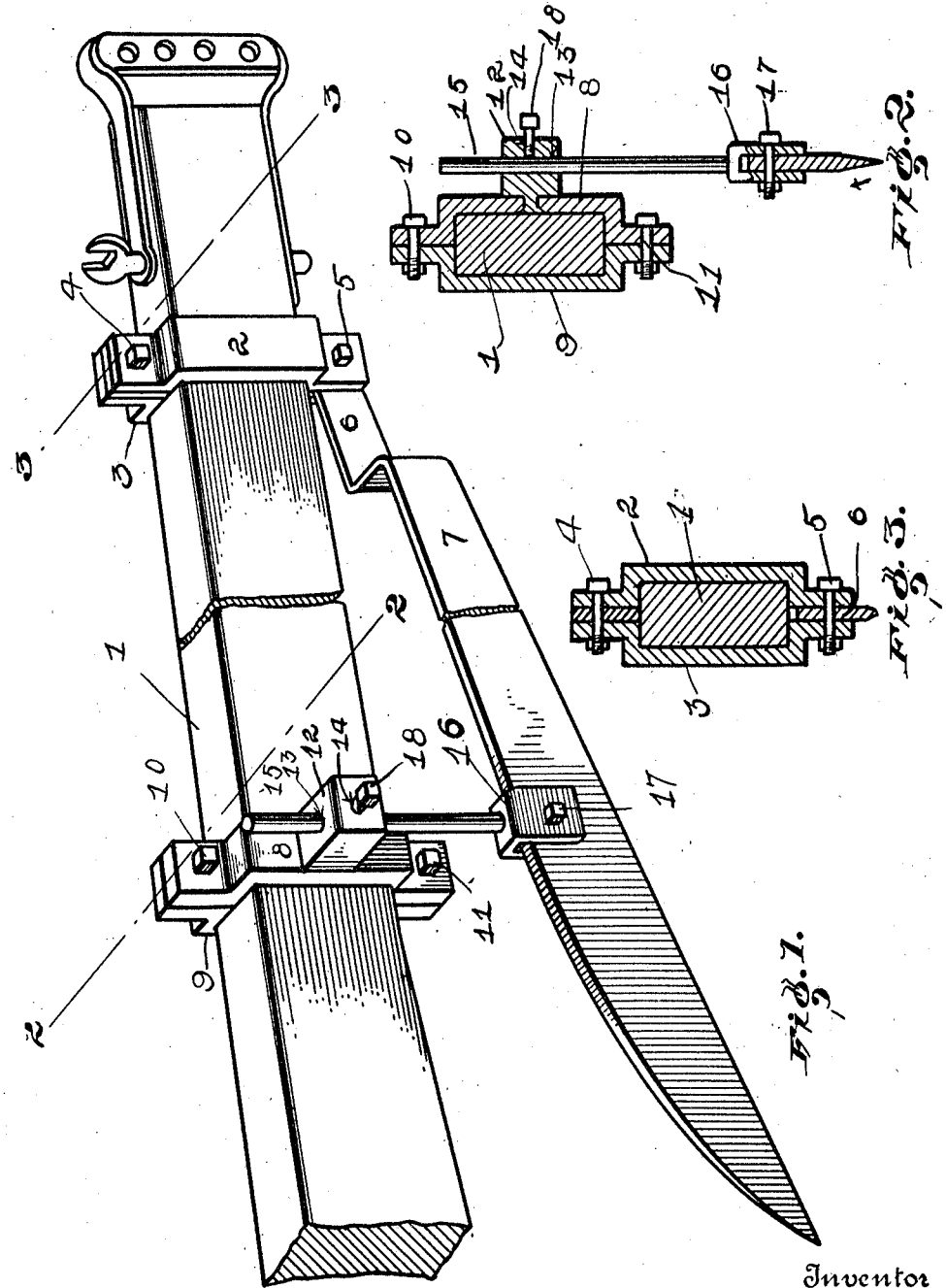
Witnesses
Inventor
Robert L. Nowell.
Attorney.

UNITED STATES PATENT OFFICE.

ROBERT LEE NOWELL, OF HEADLAND, ALABAMA.

SOD AND POTATO-VINE CUTTER.

988,805.  Specification of Letters Patent.  Patented Apr. 4, 1911.

Application filed August 1, 1910. Serial No. 574,829.

*To all whom it may concern:*

Be it known that I, ROBERT LEE NOWELL, a citizen of the United States of America, residing at Headland, in the county of Henry and State of Alabama, have invented certain new and useful Improvements in Sod and Potato-Vine Cutters, of which the following is a specification, reference being had therein to the accompanying drawing.

This invention relates to sod and vine cutters for use in connection with plows and other agricultural machines, and the principal object of the same is to provide a cutter that can be attached to the beam of the machine and so connected thereto as to permit longitudinal and vertical adjustment of the cutter relative to said beam.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a fragmentary perspective view of the beam of an agricultural machine showing the improved cutter attached thereto. Fig. 2 is a transverse vertical sectional view taken on the line 2—2, Fig. 1. Fig. 3 is a similar view taken on the line 3—3, Fig. 1.

Referring to the accompanying drawings by numerals, it will be seen that the improved sod and vine cutter has been shown in connection with a beam 1 of an agricultural machine. The improved cutter comprises a pair of forward clip members 2 and 3 which embrace the beam, the upper ears of said members being detachably connected by means of a bolt 4 and the lower clip members being similarly connected by a bolt 5. The bolt 5 also serves as a pivot for holding the shank 6 of a blade 7 between said lower ears. Blade 7 is offset relative to shank 6 so that said blade is held to one side of the beam 1.

Rear clip members 8 and 9 are detachably fastened about the beam 1 by the bolts 10 and 11. Clip member 8 is provided with a laterally projecting lug 12 which is provided with a vertical opening 13 and a threaded horizontal intersecting opening 14. A bar 15 is adjustable in opening 13, the lower end of said bar being provided with a yoke 16 that straddles the upper edge of blade 7. A bolt 17 pivotally connects the blade 7 to said yoke. A locking bolt 18 extends through opening 14 and engages bar 15 to lock the same in a desired adjusted position.

It will be seen from the foregoing that the blade 7 may be readily adjusted vertically to bring the free end thereof closer to or away from the ground, and that by means of the front and rear clips, said blade can be readily adjusted longitudinally of the beam 1.

What I claim as my invention is:—

1. A sod and vine cutter comprising a pair of clips adjustably connected to the beam of an agricultural machine, a laterally projecting lug carried by one clip, a supporting bar adjustably connected to said lug, means for locking said bar to said lug, a yoke carried by said bar, and a blade pivotally connected to said yoke and having a shank pivotally connected to one of the clips.

2. A sod and vine cutter comprising a pair of clips adapted to be adjustably engaged with the beam of an agricultural machine, a lug projecting laterally from one of said clips, a blade, means for pivotally and adjustably connecting said blade to said lug, and means for pivotally connecting the front end of said blade to one of said clips.

In testimony whereof I hereunto affix my signature in presence of two witnesses.

ROBERT LEE NOWELL.

Witnesses:
R. F. BLACKSHEAR,
E. V. GAMBLE.